Figure 1:
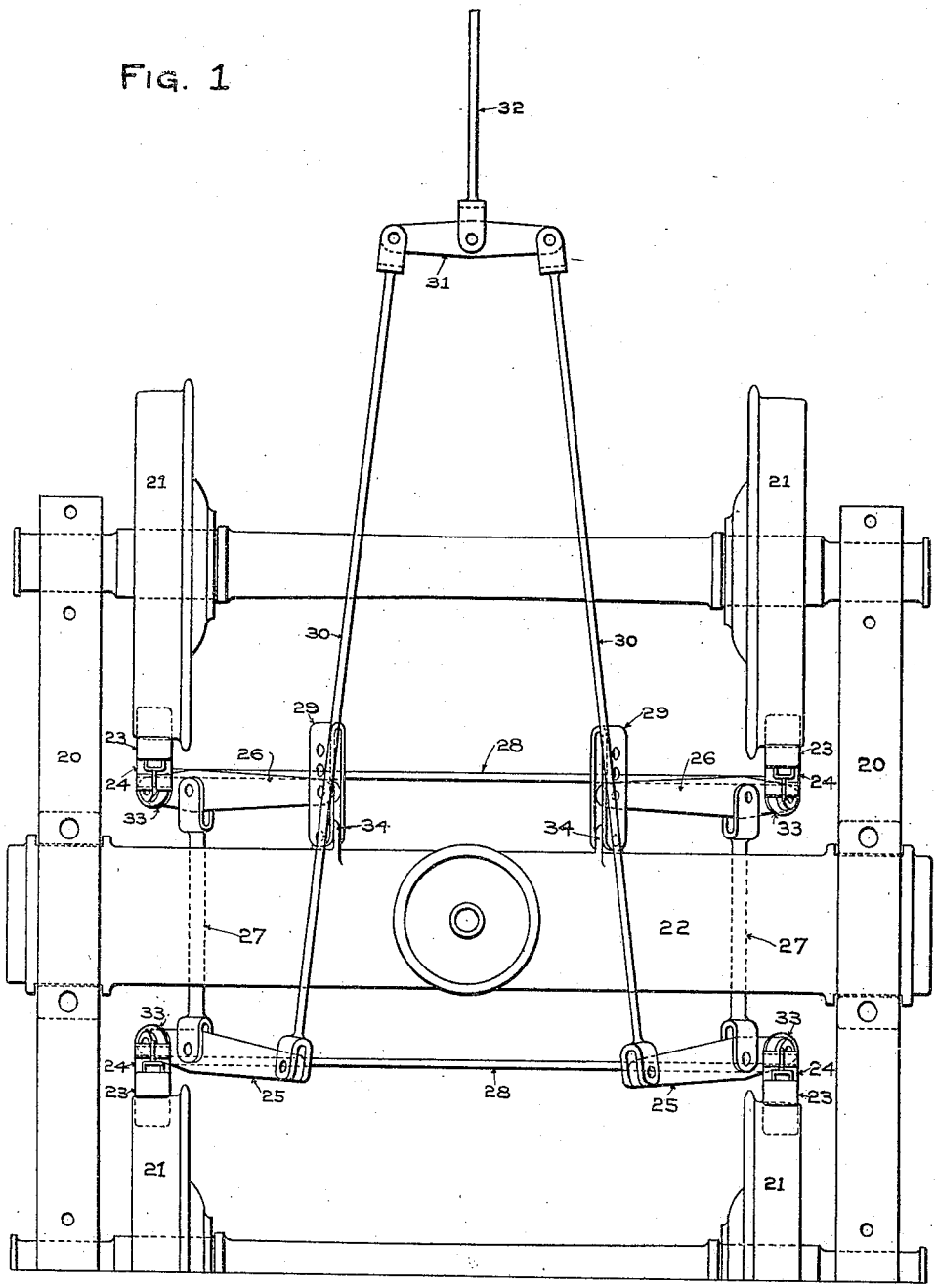

No. 838,775. PATENTED DEC. 18, 1906.
S. A. CRONE.
RAILWAY CAR BRAKE.
APPLICATION FILED AUG. 9, 1905. RENEWED AUG. 27, 1906.

6 SHEETS—SHEET 2.

WITNESSES:
William O. Freet.
Arthur Marion.

INVENTOR
Seth A. Crone
BY
Chas. O. Gill
ATTORNEY

No. 838,775. PATENTED DEC. 18, 1906.
S. A. CRONE.
RAILWAY CAR BRAKE.
APPLICATION FILED AUG. 9, 1905. RENEWED AUG. 27, 1906.

6 SHEETS—SHEET 4.

WITNESSES:
William O. Freet
Arthur Marion.

INVENTOR
Seth A. Crone,
BY Chas. O. Gill
ATTORNEY

No. 838,775. PATENTED DEC. 18, 1906.
S. A. CRONE.
RAILWAY CAR BRAKE.
APPLICATION FILED AUG. 9, 1905. RENEWED AUG. 27, 1906.

6 SHEETS—SHEET 5.

WITNESSES:
William O. Freet.
Arthur Marion.

INVENTOR
Seth A. Crone
BY
Chas. O. Gill
ATTORNEY

THE NORRIS PETERS CO., WASHINGTON, D. C.

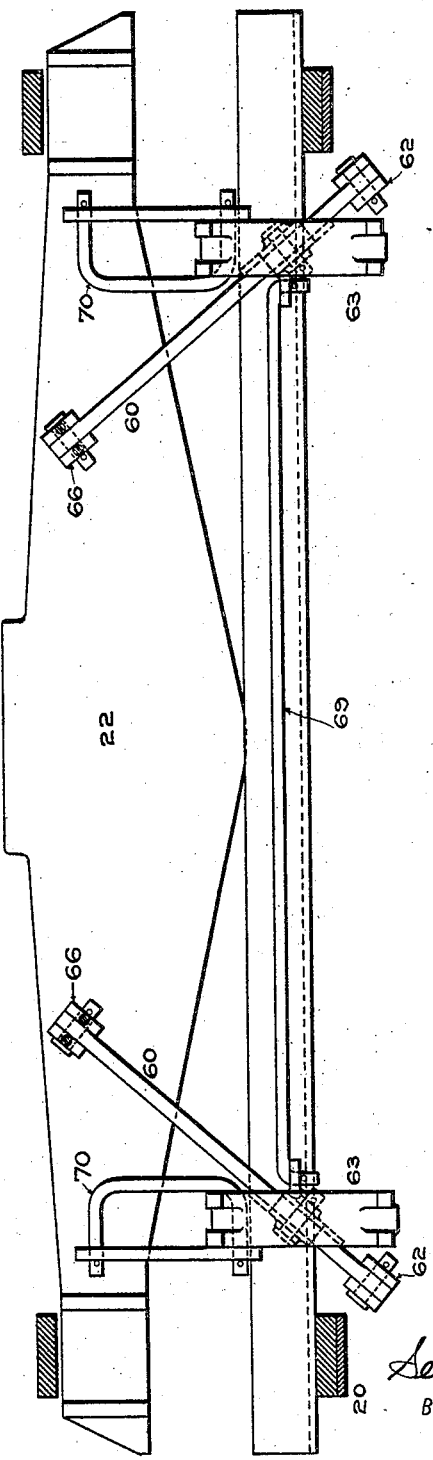

UNITED STATES PATENT OFFICE.

SETH A. CRONE, OF NEW YORK, N. Y.

RAILWAY-CAR BRAKE.

No. 838,775.          Specification of Letters Patent.          Patented Dec. 18, 1906.

Application filed August 9, 1905. Renewed August 27, 1906. Serial No. 332,205.

*To all whom it may concern:*

Be it known that I, SETH A. CRONE, a citizen of the United States, and a resident of New York city, in the county of New York and State of New York, have invented certain new and useful Improvements in Railway-Car Brakes, of which the following is a specification.

The invention relates to improvements in car-brakes; and it consists in the novel features, arrangements, and combinations of parts hereinafter described, and particularly pointed out in the claims.

The object of my invention is to produce an efficient car-brake system in which the usual brake-beams are dispensed with and the brake-shoes operated directly from the brake-levers, which in the present instance are directly connected with the brake-shoe heads.

One of the special objects of my invention is to increase the efficiency and operative character of beamless car-brake systems and to provide a system in which increased power may be secured for applying the brakes and the mechanism comprised in said system may be carried inwardly from the side frames of the truck, all of the mechanism of my brake system being, by preference, set inwardly of the side frames and largely inwardly of the car-wheels.

In carrying out my invention I connect the brake-shoe heads at opposite sides of the car-truck by means of stay-rods, which maintain the relation of said heads with respect to each other and to the wheels, and I directly operate said heads by brake-levers which incline inwardly and upwardly from said heads, the upper ends of the live-levers being pivotally connected with the operating or draft rods and the upper ends of the dead-levers being pivotally mounted in the dead-lever guides supported from the bolster. I also connect the live and dead levers at each side of the car-truck by a rod, so as to insure coöperative action in said levers. The brake-shoe heads are supported by suitable hanger-links, as is customary with respect to brake-shoe heads carried by brake-beams.

The invention will be fully understood from the detailed description hereinafter presented, reference being had to the accompanying drawings, in which—

Figure 2:
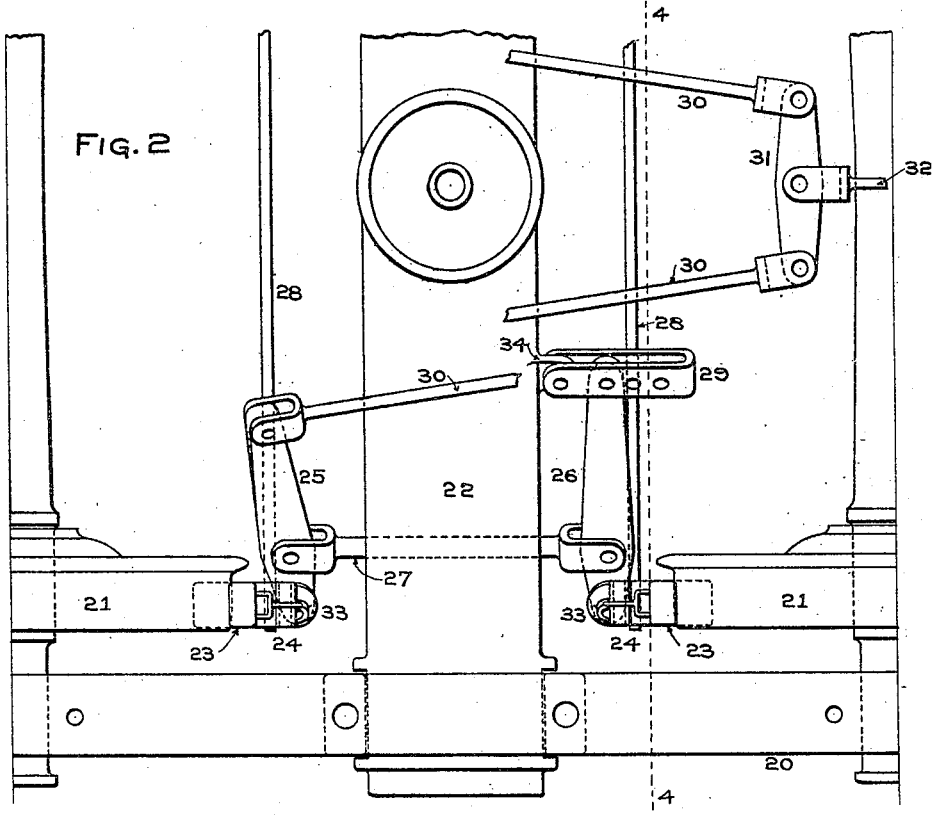
Figure 3:
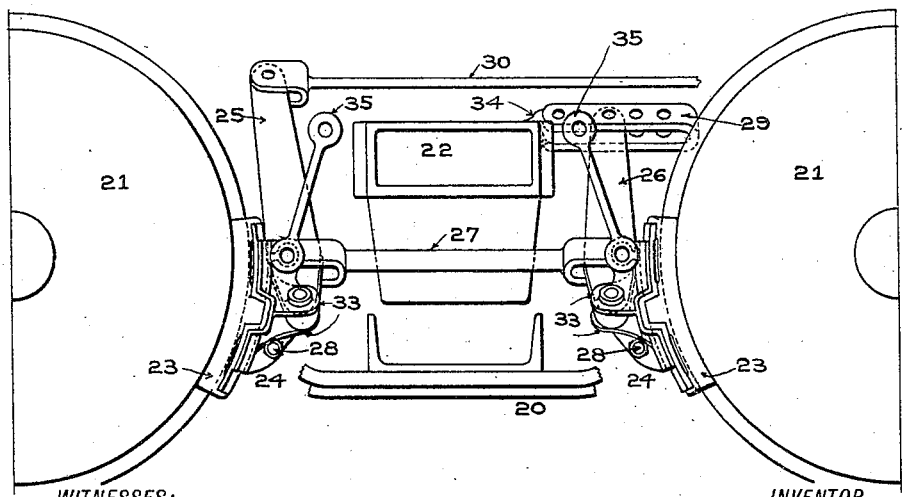
Figure 4:
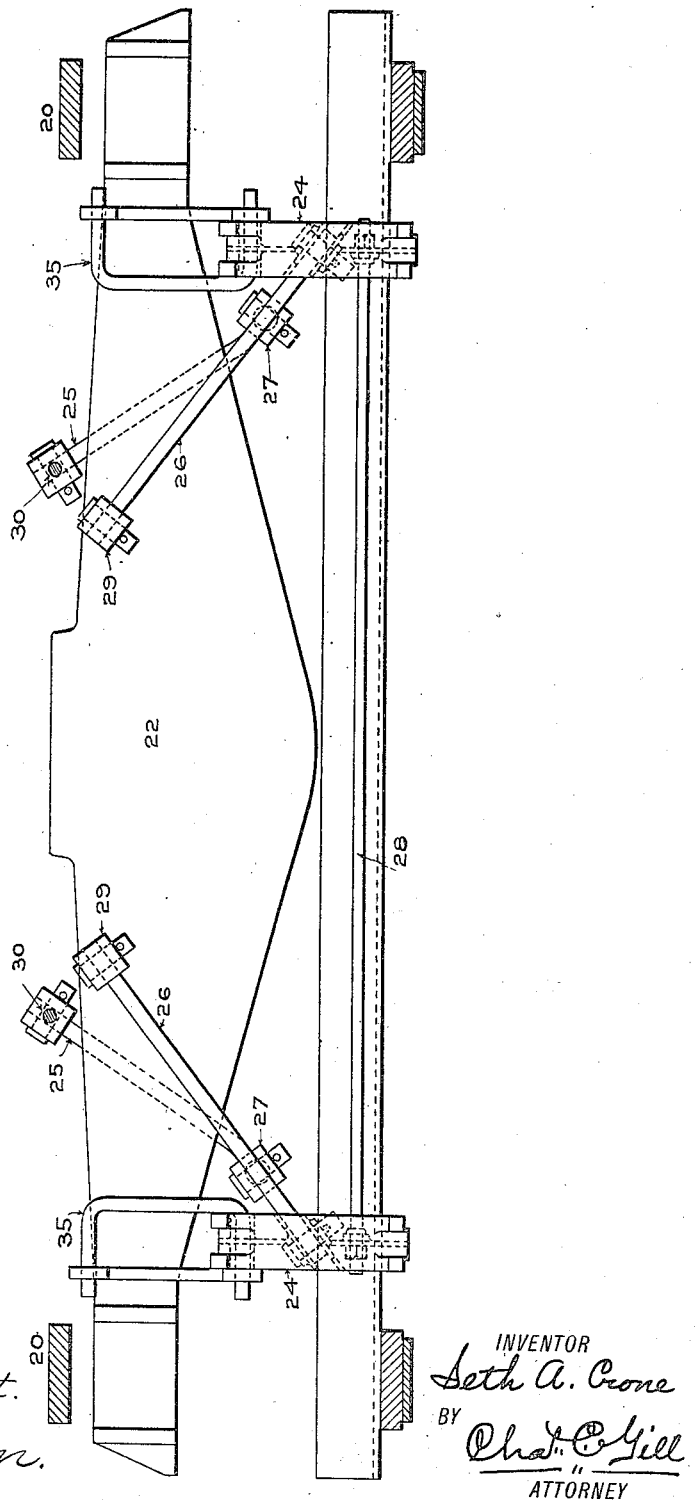
Figure 5:
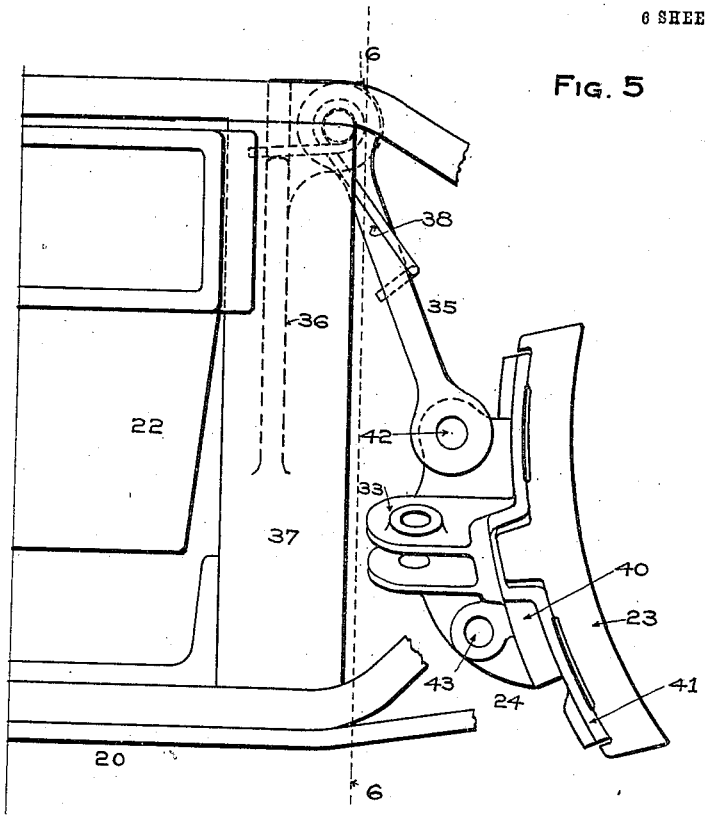
Figure 6:
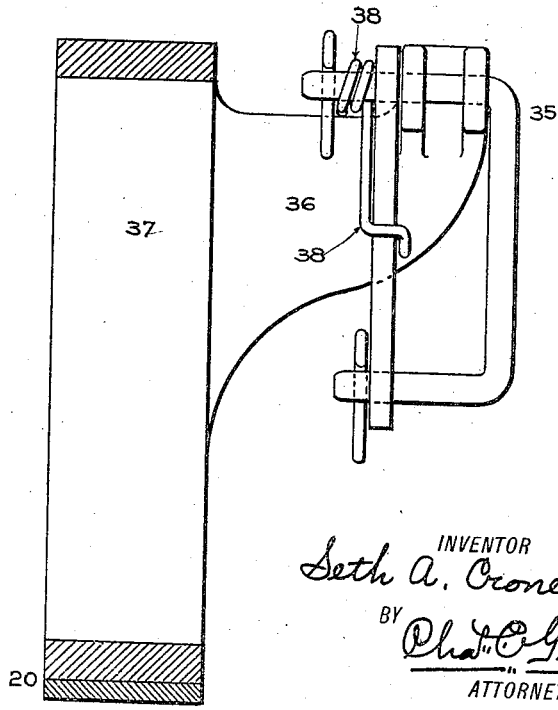
Figure 7:
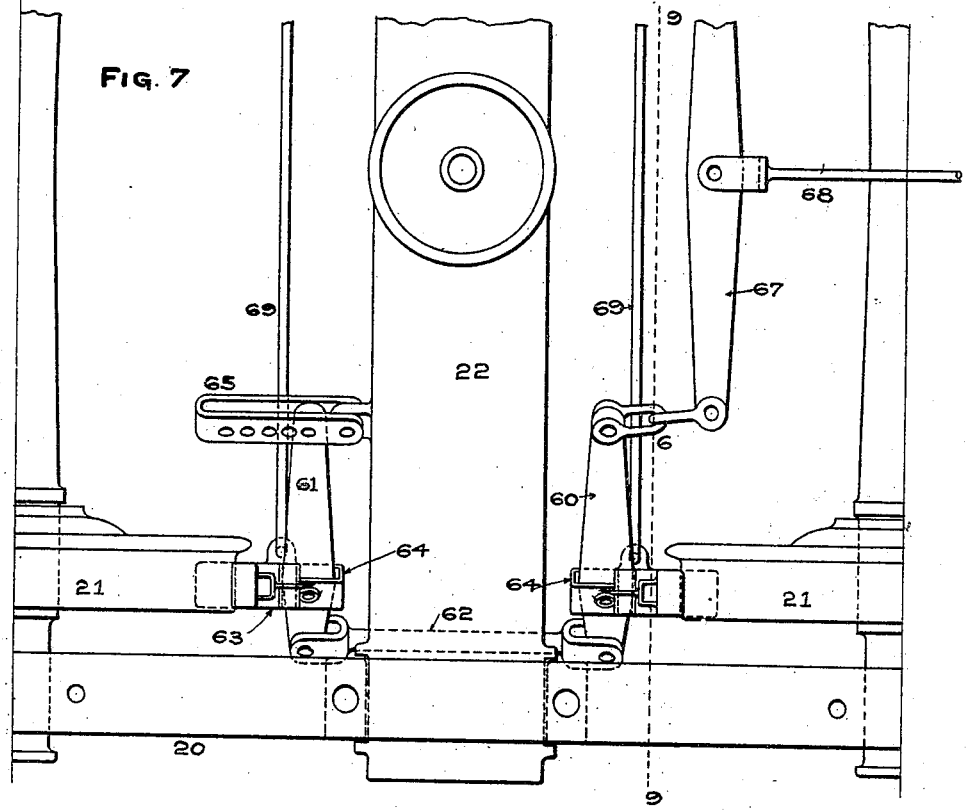
Figure 8:
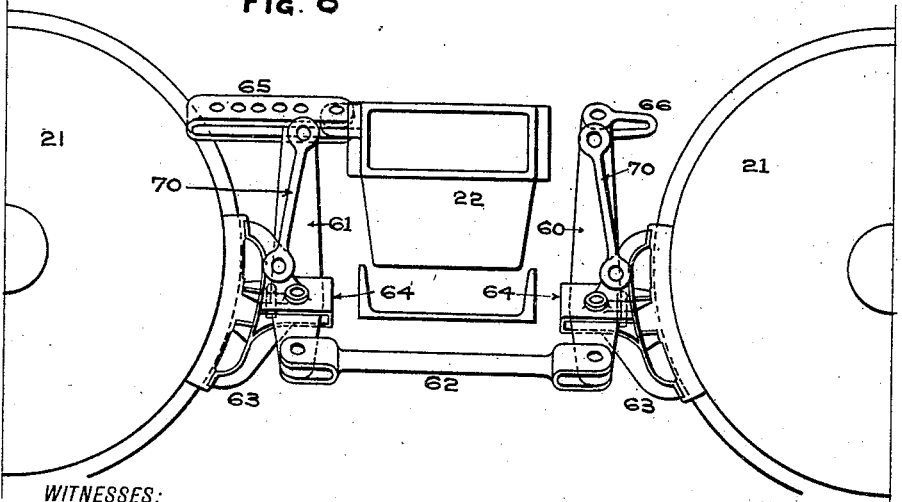

Figure 1 is a top view, partly cut away, of a freight-car truck equipped with brake mechanism embodying my invention. Fig. 2 is an enlarged top view, partly broken away, of a portion of same. Fig. 3 is a side elevation, partly broken away, of same. Fig. 4 is a transverse section across the entire width of the car-truck on the dotted line 4 4 of Fig. 2. Fig. 5 is an enlarged side elevation of a portion of the middle part of the side frame of the truck and illustrates the method of applying the hangers to the brake-shoe heads and also the springs for aiding in releasing the brake-shoes from the wheels. Fig. 6 is a transverse section of same on the dotted line 6 6 of Fig. 5. Fig. 7 is a top view of a portion of a car-truck equipped with a modified form of my invention. Fig. 8 is a side elevation of a portion of same; and Fig. 9 is a transverse section of same on the dotted line 9 9 of Fig. 7.

In the drawings, 20 designates the usual side frames of a diamond-truck, 21 the usual wheels, and 22 the bolster.

Referring to Figs. 1, 2, 3, and 4, 23 designates the brake-shoes; 24, the brake-shoe heads; 25, the live brake-levers; 26, the dead brake-levers; 27, pivoted rods connecting said levers at each side of the truck; 28, rods extending transversely of the truck and connecting the brake-shoe heads; 29, the dead-lever guides, pivotally connected with the bolster and adjustably receiving the upper ends of the dead levers; 30, draft-rods pivotally connected with the upper ends of the live levers and being themselves connected by an equalizing-bar or floating lever 31, and 32 a draft-rod connected with said equalizing-bar and through which power from any suitable source may be exerted for applying the brake-shoes 23 to the wheels 21. The brake-heads 24 have upon their back the diagonally-disposed apertured jaws or wings 33, between which the lower ends of the levers 25 26 are pivoted and from which said levers extend upwardly and inwardly toward the center of the truck, the levers 25 extending slightly above the upper line of the bolster 22, where they are pivotally connected with the rods 30, which extend above said bolster to the equalizing-bar 31. The levers 26 extend upwardly and inwardly to about a line with the upper surface of the bolster, where they are pivotally secured in the guides 29, which are folded apertured plates forming guide-loops and are diagonally disposed and pivotally secured to ears 34, extending from the upper side edges of the bolster. The rods 27 are pivotally secured to and connect the brake-levers 25 26 at points intermediate the ends of the latter, and these rods 27, as shown in Figs. 3 and 4, are disposed below the end portions of the bolster.

The brake-shoe heads 24 are suspended by hangers 35 of usual construction, these hangers having been omitted from Figs. 1 and 2 for clearness of illustration and shown in Figs. 4, 5, and 6. In Figs. 5 and 6 it will be seen that the hangers 35 are pivotally suspended from bracket-arms 36, connected or cast with the column-posts 37, and that they are equipped with coiled springs 38, whose normal tension is exerted to move the brake-shoes from the car-wheels. The hangers 35 are in themselves of known construction and are disclosed in Letters Patent No. 773,003, granted October 25, 1904, to me.

With respect to the invention so far as hereinbefore described, I call attention to the fact that the brake-levers 25 26 at both sides of the truck extend upwardly and inwardly and that the means for operating them are removed from the side frames, this upward and inward inclination of said levers enabling me to employ levers of considerable length and great power and to secure a more direct and efficient action of the draft-rods 30 on said levers, the upper portion of the latter and said rods occupying the middle portions of the truck and being very greatly removed from the side frames and wheels of the truck. My invention permits of the use of brake-shoe levers of maximum length and efficient disposition and adapted to modern car-truck structures. The rods 27 being intermediate the ends of the levers 25 26 become practically disposed inwardly of the line of the wheels, and when the rods 30 act upon the levers 25 the motion of the latter is communicated through the rods 27 to the levers 26, whereby simultaneous action in the brakes is secured.

The brake-shoe heads 24 are in themselves of novel construction and each comprises, Fig. 5, a cast malleable back 40 and a forged metal face 41, said back being formed with the diagonally-disposed apertured jaws or wings 33 to receive the brake-lever, an eye 42 to receive the lower end of the hanger 35, and an aperture 43 to receive the end of the rod 28. The special construction of brake-shoe head 24 shown in Fig. 5 is made the subject of a separate application, Serial No. 273,345, filed August 9, 1905, for Letters Patent, and in respect of the present application the novel feature of said head may be considered as residing in the diagonally-disposed jaws or wings 33 to receive the upwardly and inwardly inclined brake-levers. I do not limit the present invention, therefore, to the employment of brake-shoe heads comprising a malleable cast back and a forged-metal face-plate.

The modification shown in Figs. 7, 8, and 9 consists mainly in pivoting the live and dead brake-levers 60 61 to the brake-shoe heads at a point intermediate the ends of said levers and in applying connecting-rods 62 to the lower projecting ends of said levers. In Figs. 7, 8, and 9 the brake-shoe heads 63 are of usual character, with the exception that said heads are formed with a diagonally-disposed loop 64, between the sides of which the levers 60 61 are mounted, said levers 60 61 inclining upwardly and inwardly the same as the levers 25 26 of Figs. 1 to 4, inclusive. The upper ends of the dead-levers 61 are secured in the dead-lever guides 65, and the upper ends of the live-levers 60 are connected by links 66 to the equalizing-bar 67, to which the draft-rod 68 is connected. The shoes 63 are connected by rods 69 and suspended by hangers 70, as described with respect to the brake-shoe heads shown in Figs. 1 to 6, inclusive. Power exerted against the draft-rod 68 to apply the brakes will be communicated from the live-levers 60 through the rods 62 to the dead-levers 61. In Figs. 7, 8, and 9 the ends of the rods 69 are shown as bent downwardly and passing through apertured ears formed on the brake-shoe heads 63, while in Fig. 4 the corresponding rod 28 is shown as passing through horizontal apertures in the brake-shoe heads and secured by nuts.

I prefer the brake system illustrated in Fig. 1; but there are some instances in which, due to the special construction and dimensions and relative locations of the parts of car-trucks, it may not be entirely convenient to employ the system exactly as shown in Fig. 1, and in such instances the arrangement of parts shown in Figs. 7, 8, and 9 will be made use of. In both of the arrangements of parts illustrated the brake-levers extend upwardly and inwardly from both sides of the truck, whereby the advantages hereinbefore referred to are secured.

What I claim as my invention, and desire to secure by Letters Patent, is—

1. In a car-brake system, the brake-heads carrying brake-shoes, and means suspending the same, combined with the live and dead brake-levers pivotally connected with said heads and extending inwardly and upwardly therefrom at opposite sides of the truck to about the upper level of the transom or bolster, means pivotally securing the upper ends of the dead-levers, rods connecting the live and dead levers in pairs at each side of the truck to secure coöperative action in the same, and power mechanism connected with the upper ends of the live-levers; substantially as set forth.

2. In a car-brake system, the brake-heads carrying brake-shoes, means suspending said heads, and transverse tie-rods extending across the truck and connecting the heads at opposite sides thereof, combined with live and dead brake-levers pivotally connected with said heads at opposite sides of the truck, means pivotally securing the dead-levers, means connecting the live and dead levers in pairs at each side of the truck, and power mechanism connected with the live-levers for operating the system, said mechanism comprising an equalizing-bar, means for applying power thereto and rods connecting said bar with said live-levers; substantially as set forth.

3. In a car-brake system, the brake-heads carrying brake-shoes, means suspending said heads, and transverse tie-rods extending across the truck and connecting the heads at opposite sides thereof, combined with the live and dead levers pivotally connected with said heads and extending inwardly and upwardly therefrom at opposite sides of the truck, means pivotally securing the dead-levers, means connecting the live and dead levers in pairs at each side of the truck, and power mechanism connected with the live-levers for operating the system, said mechanism comprising an equalizing-bar, means for applying power thereto and rods connecting said bar with said live-levers; substantially as set forth.

4. In a car-brake system, the brake-heads carrying brake-shoes, and means for suspending the same, combined with the brake-levers pivotally connected with said heads and extending upwardly and inwardly therefrom at opposite sides of the truck, transverse rods connecting said heads, rods connecting the live and dead levers in pairs, springs normally operating to move said shoes from the car-wheels, and power mechanism connected with the live-levers for operating said system; substantially as set forth.

5. In a car-brake system, the brake-heads carrying brake-shoes, and means suspending the same, combined with the live and dead brake-levers pivotally connected with said heads and extending inwardly and upwardly therefrom at opposite sides of the truck to about the upper level of the transom or bolster, dead-lever guides connected with the transom or bolster and receiving the upper ends of the dead-levers, rods connecting the live and dead levers in pairs at points above their lower ends, and power mechanism connected with the upper ends of the live-levers; substantially as set forth.

6. In a car-brake system, the brake-heads carrying brake-shoes, and means for suspending the same, combined with the brake-levers pivotally connected with said heads and extending upwardly and inwardly therefrom at opposite sides of the truck, transverse stay-rods connecting the heads at opposite sides of the truck, rods connecting the live and dead levers in pairs and extending below the bolster, dead-lever guides connected with the bolster and receiving the upper ends of the dead-levers, and power draft-rods extending above the bolster and connected with the upper ends of the live-levers; substantially as set forth.

Signed at New York city, in the county of New York and State of New York, this 7th day of August, A. D. 1905.

SETH A. CRONE.

Witnesses:
CHAS. C. GILL,
ARTHUR MARION.